United States Patent [19]

Struve

[11] 4,381,264

[45] Apr. 26, 1983

[54] PROCESS FOR THE CONJUGATION OF THE DOUBLE BONDS OF POLYUNSATURATED FATTY ACIDS AND FATTY ACID MIXTURES

[75] Inventor: Alfred Struve, Hilden, Fed. Rep. of Germany

[73] Assignee: Henkel Kommanditgesellschaft Auf Aktien, Dusseldorf-Holthausen, Fed. Rep. of Germany

[21] Appl. No.: 265,541

[22] Filed: May 20, 1981

[30] Foreign Application Priority Data

May 24, 1980 [DE] Fed. Rep. of Germany ....... 3019963

[51] Int. Cl.[3] .................................. C09F 7/08

[52] U.S. Cl. .................................. 260/405.6

[58] Field of Search .................................. 260/405.6

[56] References Cited

U.S. PATENT DOCUMENTS

| | | | |
|---|---|---|---|
| 1,896,467 | 2/1933 | Scheiber | 260/405.6 |
| 2,418,454 | 4/1947 | Auer | 260/405.6 |
| 3,257,377 | 6/1966 | Hannah | 260/407 |
| 4,164,505 | 8/1979 | Krajca | 260/405.6 |

*Primary Examiner*—John F. Niebling
*Attorney, Agent, or Firm*—Hammond & Littell, Weissenberger and Muserlian

[57] ABSTRACT

A process for the conjugation of the double bonds of polyunsaturated fatty acids or mixtures of fatty acids containing polyunsaturated fatty acids comprising treating said fatty acids with $SO_2$ in the presence of substoichiometric amounts of soap-forming bases in a closed reaction vessel or in a reaction vessel equipped with a reflux condenser, at a temperature range of from 170° C. to 260° C.; particularly wherein the process is performed in the presence of from 0.5 to 25 mol % of $SO_2$, 0.5 to 25 mol % of soap-forming alkali metal and/or alkaline earth metal compounds, and 0.05 to 2% by weight, based on the fatty acid starting material, of water.

11 Claims, No Drawings

PROCESS FOR THE CONJUGATION OF THE DOUBLE BONDS OF POLYUNSATURATED FATTY ACIDS AND FATTY ACID MIXTURES

BACKGROUND OF THE INVENTION

The conjugation of the double bonds of polyunsaturated fatty acids of the type that are accumulated or present in mixtures of natural fatty acids, for example, is of technological importance. Such mixtures of fatty acids are obtained by the cleaving of the more highly unsaturated fats, for example from soybean oil, sunflower oil, linseed oil, talloil and similar substances. These mixtures of fatty acids contain as compounds that can be conjugated mainly the double unsaturated linoleic acid and the triple unsaturated linolenic acid. The double bonds of these acids are separated from one another respectively by methylene groups.

The conjugation of the double bonds of these polyunsaturated fatty acids converts them into a form capable of chemically stronger reactions. It has been demonstrated that they offer a great advantage in the conjugated form in their main field of application, that is in drying oils. Conjugated double bonds can undergo the Diels-Alder reaction. Consequently, the field of application is expanded for the conjugated fatty acids.

The processes for the conjugation of fatty acids known so far and used in the technology are relatively complex, require expensive catalysts or have a detrimental effect on the environment. Iodine or nickel catalysis are suggested, for example. According to the German Published Application DE-OS No. 22 61 517, complex organic sulfur compounds are used. The U.S. Pat. No. 2,350,583 describes the conjugation with the use of the sodium salts of fatty acids. In this large-scale process the conjugated fatty acid must be released with mineral acid from its sodium salt in a second step, resulting in a full equivalent of an inorganic salt as by-product.

Occasionally the literature also contains references to the effect that gaseous $SO_2$ can be used for the conjugation. However, $SO_2$ alone yields demonstrably poor degrees of conjugation beside relatively large amounts of polymers of fatty acids. For example, a mixture of fatty acids of sunflower oil with a content of about 60% linoleic acid is converted into a product with only 10% conjuene fatty acids and 12% polymeric fatty acids by passing $SO_2$ through for 4 hours at 225° C. A "conjuene" fatty acid is polyunsaturated fatty acid having conjugated double bonds.

U.S. Pat. No. 3,257,377 describes the preparation of emulsifying agents from talloil for the polymerization of unsaturated compounds. For this purpose, talloil is treated with sulfur dioxide first in the temperature range from about 200° C. to 320° C. until the colophonic resin acids are disproportionated and the fatty acids are conjugated, and then it is treated in the presence of an alkaline compound at 250° C. to 330° C. for the further disproportionation and dimerization of the conjugated fatty acids. The alkaline compound also may be added in the first process step of the treatment with sulfur dioxide. The concomitant use of 2 to 5% by weight of the alkaline compound, for example alkali metal hydroxides, carbonates or sulfides is suggested. The $SO_2$ passed through the talloil that is heated to high temperatures is in the gaseous state. The subsequent processing shows that only small amounts of distillable monomeric conjuene fatty acids are formed by this method, even when the dimerization step is omitted.

OBJECTS OF THE INVENTION

An object of the present invention is the development of a process for the conjugation of the double bonds of polyunsaturated fatty acids or mixtures of fatty acids containing polyunsaturated fatty acids to give predominately conjuene fatty acids especially trans-trans conjugation with little dimerization.

Another object of the present invention is the development of a process for the conjugation of the double bonds of polyunsaturated fatty acids consisting essentially of treating an acidic material consisting essentially of polyunsaturated fatty acids or mixtures of fatty acids containing polyunsaturated fatty acids, with $SO_2$ in the presence of a substoichiometric amount of at least one soap-forming base at a temperature range of from 170° C. to 260° C., and recovering conjugated double bond polyunsaturated fatty acids, wherein said treating step is performed in the presence of from 0.5 to 25 mol %, based on said acidic material of $SO_2$; from 0.5 to 25 mol %, based on said acidic material of at least one soap-forming base selected from the group consisting of alkali metal compounds and alkaline earth metal compounds; and from 0.05 to 2% by weight, based on said acidic material, of water.

These and other objects of the present invention will become more apparent as the description thereof proceeds.

DESCRIPTION OF THE INVENTION

The present invention involves the discovery of a process that permits the conjugation of the double bonds of polyunsaturated fatty acids or mixtures of fatty acids utilizing $SO_2$, which yields surprisingly good conjugation results but works with limited amounts of bases. The process of the invention described in the following text permits, for example, the conjugation of almost the entire available linoleic acid of a mixture of natural fatty acids within a period of 4 hours at 225° C. in the presence of only 0.2 to 0.3% by weight of alkali based on the mixture of fatty acids used. These conditions of reaction time and temperature have been necessary also for the adequate conjugation of the completely saponified fatty acid, however.

The subject of the invention is thus a process for the conjugation of the double bonds of polyunsaturated fatty acids or mixtures of fatty acids containing polyunsaturated fatty acids by treatment with $SO_2$ in the presence of soap-forming bases in substoichiometric amounts, this process being characterized in that the treatment of the fatty acid starting material takes place in a closed reaction vessel or in a reaction vessel equipped with a reflux condenser, at the temperature range from 170° to 260° C.

More particularly, the present invention relates to a process for the conjugation of the double bonds of polyunsaturated fatty acids consisting essentially of treating an acidic material consisting essentially of polyunsaturated fatty acids or mixtures of fatty acids containing polyunsaturated fatty acids, with $SO_2$ in the presence of a substoichiometric amount of at least one soap-forming base at a temperature range of from 170° C. to 260° C., and recovering conjugated double bond polyunsaturated fatty acids, wherein said treating step is performed in the presence of from 0.5 to 25 mol %, based on said acidic material of $SO_2$; from 0.5 to 25 mol %, based on said acidic material of at least one soap-forming base selected from the group consisting of alkali metal compounds and alkaline earth metal compounds; and from 0.05 to 2% by weight, based on said acidic material, of water.

The process according to the invention allows the perfect reproduction of high reaction yields of conjugated polyunsaturated fatty acids. Measured against the state of the art, there is a significant improvement that could not have been anticipated. When the work is performed in an open vessel, for example, without observing certain precautions that shall be described below, no steps can be taken to assure definitely reproducible results with respect to the yield of conjugated fatty acids, as the experience shows on which the invention is based. When working in a closed reaction vessel and in the indicated temperature range, however, the desired high yields of conjuene fatty acids can be obtained in an indefinitely repeatable manner. The action of water or traces of water in the reaction can be assumed with a high degree of likelihood, the presence of water or traces of water is assured by the measures according to the invention and which shall be discussed in detail below. Thus the water content in the reaction mixture is preferably at least about 0.05% by weight, based on the fatty acid starting material.

The water content in the reaction zone preferably does not exceed 1.5% by weight and especially not 1% by weight. Particularly suitable are water contents ranging from 0.1% to 1% by weight. In general, at least about 0.2% by weight of water should be present in the reaction mixture, so that the range from 0.2% to 1% by weight is especially useful for practical applications. All of these numerical values in percent by weight are based on the starting material containing the unsaturated fatty acids.

It was surprising to find that apparently the presence of even small amounts of water in the reaction mixture has a decisive influence on the desired formation of the conjuene fatty acids. It must be taken into account for the performance of the process according to the invention that small amounts of water are present in the reaction mixture or that they are formed in it. For example, a very low water content (<0.1%) is introduced with the mixture of fatty acids and water of reaction is produced particularly by salt formation and possibly a limited formation of anhydride. However, also to be considered is the fact that the process according to the invention takes place in the temperature range far above the boiling temperature of water and that the miscibility of the reaction material with water is extremely low at those high temperatures. Thus when $SO_2$ is passed through the hot batch, for example, without special precautions, the water can be removed in the $SO_2$ stream by the most direct route. Then, the conjuene content of the reaction product, for example, after 4 hours at 225° C., can be below 10%.

According to the invention, care is taken that the prescribed water content is present in the reaction mixture during the entire period of conjugation. The desired water can here be added, supplemented discontinuously and/or continuously, or recycled, particularly by a reflux condenser. These measures allow work in an open reaction vessel, that is a reaction vessel open to the atmosphere, in an additional form of execution according to the invention. However, the conjugation in the closed reaction vessel may be especially preferred according to the invention, in which case the reaction takes place under the reaction mixture's own pressure. This procedure assures the maintenance of the desired concentration of water in the reaction mixture in an especially simple manner.

In general, it may be adequate to work without the addition of exogenous water and to use only those amounts of water for the facilitation of the desired conjugation that are formed during the course of the reaction and/or introduced into the reaction mixture by the reactants. It has been established that, in practice, water contents in the range of at least 0.1% by weight, based on the mixture of fatty acids, are achieved in this manner. The technical solution of the problem according to the invention is possible with these amounts of water, while taking into consideration the other parameters of the process described below.

Another important parameter of the process according to the invention is the amount of soap-forming base that is added to the reaction mixture. The amount of base, based on the fatty acids that are used, generally is in the range from 0.5 to 25 mol%, preferably in the range from 1 to 12.5 mol%. Particularly suitable is the working with amounts from 1.5 to 10 mol%. Especially preferred as soap-forming bases are respective alkali metal and/or alkaline earth metal compounds, the alkali metal compounds being the more important representatives. Any desired soap-forming components of the mentioned groups may be used. Especially suitable are the hydroxides or oxides. Preferred representatives of these reactants are thus the hydroxides of sodium, potassium or lithium and the oxides or hydroxides of barium or magnesium. NaOH is a particularly suitable representative of this group. It can be used in amounts of 0.1 to 5% by weight, preferably in amounts of 0.2 to less than 2% by weight, based on the fatty acids that are used.

$SO_2$ can be added in gaseous form to the reaction mixture or, if desired, it can be passed through the reaction mixture at least during a period of the conversion. In the latter case, however, care must be taken, as explained above, that the water content of the reaction mixture does not drop below the required minimum content.

The amount of $SO_2$ dissolved in the fatty acid is preferably at least about 0.2% by weight, especially at least about 0.3% by weight. Normally, not more than 7.5% by weight of $SO_2$ are introduced based respectively on the fatty acid mixture that is used. Especially preferred ranges of $SO_2$ expressed in mol% and based on the starting material that is used, are the following: 0.5 to 25 mol %, preferably 1 to 12.5 mol % and particularly 1.5 to 8 mol % of $SO_2$.

Those salts that liberate $SO_2$ under the reaction conditions may also be used in addition to, or instead of, the free $SO_2$. Suitable for example, are sodium sulfite, sodium disulfite (sodium metasulfite) or even sodium dithionite. However, in these cases the salt always must be added in an adequate amount so that sufficient $SO_2$ is set free. Normally, the number of metal cations then available for the saponification of the fatty acid is greater than absolutely necessary.

An adequate $SO_2$ concentration normally is reached even at standard pressure in the open vessel, as $SO_2$ is passed through and/or $SO_2$ liberating salts are added. However, even the factor of the volatile $SO_2$ emphasizes the suitability of working in a closed vessel to prevent unnecessary losses of $SO_2$. In this case, the addition of 0.5% $SO_2$ or 1.5% $Na_2SO_3$, for example, produces a pressure of about 3 bar at the reaction temperature, and the process according to the invention consequently can take place in normal technical metal vessels equipped with agitators. Even the small amounts of released water can be kept under control or retained in the batch by this method.

A previously isolated polyunsaturated fatty acid or acids or respective mixtures of fatty acids containing polyunsaturated fatty acids may be used as starting material. The preferred starting material is natural fatty acid mixtures such as are obtained by the cleaving of more highly unsaturated fats, particularly vegetable fats, thus for example respective fatty acid mixtures from the cleaving of soybean oil, sunflower oil, safflower oil, linseed oil, talloil and similar fats. The content of polyunsaturated fatty acids generally is at least 30% by weight, frequently at least 40% by weight. Under actual working conditions, the content of polyunsaturated components in such fatty acid mixtures frequently is from 35 to 75% by weight. The process according to the invention can be particularly suitable for those starting materials of natural origin that are low in saturated components and consequently higher than 50% by weight in unsaturated components.

The process temperature for the conjugation under the conditions according to the invention lies between 170° and 260° C., preferably between 180° and 240° C. The process time is generally between 1 and 10 hours, with the process period from 1 to 6 hours probably being of special importance. The variation of the process parameters makes it possible, on the one hand, to assure a quick and complete conjugation and on the other hand, to suppress the formation of polymeric reaction products almost completely.

However, even the conjugation according to the invention always is accompanied by a limited oligomerization of the fatty acids. It is possible to keep the formation of dimeric fatty acids below 15%, and even under 10%. These dimeric fatty acids themselves can be used in numerous ways. The monomeric conjuene fatty acids and oligomerization products formed by the process can be separated from one another by distillation. This separation is not necessary, however, for many purposes. The formation of the dimeric fatty acids is a consequence of the special constitution of the conjuene fatty acids formed during the process according to the invention.

The products of the invention are distinguished by a comparably high trans-trans content of the conjuene fatty acids. This is a special advantage of the process according to the invention. The trans-trans structure is characterized by the increased ability to form Diels-Alder adducts. The British Patent GB-PS No. 1,141,690, for example, describes a process by which cis-trans-conjugated fatty acids can be converted into corresponding trans-trans conjugated acids in an additional, second process step. The conjugation of the completely saponified fatty acids according to the state of the art yields mainly cis-trans fatty acids and only about one-tenth of the conjuene fatty acids in the trans-trans form. The process according to the invention, in contrast, yields about six-tenths of the conjuene fatty acids in the trans-trans form, about one-third in the cis-trans form, and less than one-tenth in the cis-cis form. This ratio of cis-trans to trans-trans is close to the equilibrium of 29:71 (Chipault et al.: J. Am. Oil Chem. 37: pages 176 ff, 1960). The previously described formation of a maximum of 10 to 15% dimeric fatty acid is an attendant phenomenon that can hardly be suppressed during the preparation of a mainly trans-trans-conjugated fatty acid in one step from linoleic acid in the temperature range from about 200° to 250° C.

The following examples are illustrative of the practice of the invention without being limitative.

EXAMPLES

In the following examples, use is made of a fatty acid mixture of sunflower oil that was separated by the "hydrophilization process" into sunflower oil fatty acids at 5° C., cf. Ullmann Encyclopadie der technischen Chemie, 4th edition 1976, vol. 11, p. 537 (Umnetzverfahren). The saturated components of the product are partially separated and the product consists of:

64% linoleic acid
27% oleic acid
2% stearic acid
5% palmitic acid
1% arachic acid
1% myristic acid Here and in the following, the given percentages are by weight, unless otherwise indicated. The analysis for the determination of the conjugation in percent is performed by the regular ultraviolet methods.

EXAMPLE 1

Ten gm of sodium hydroxide were added to 1,000 gm of the mixed fatty acid (64% linoleic acid). The batch was heated to 225° C. with agitation and addition of $SO_2$ (about 50 gm/hr) in a three-neck flask with reflux condenser, thermometer and gas intake tube. This temperature was maintained for 4 hours, but the addition of $SO_2$ was stopped after 0.5 hour/225° C. A water content of about 0.5% by weight was established in the reaction space and was maintained during the entire period in the reaction space by reflux cooling and the early stopping of the $SO_2$ stream. The product was mixed with 150 ml of 10% sulfuric acid and then washed about neutral with water. The high vacuum distillation at approx. 0.1 mbar (through Claisen attachment) until a pot temperature of 230° C. was reached, yielded 84% of distillate and 16% of residue. The content of conjuene fatty acid in the distillate was 47%. The color determination in the Lovibond tintometer, 5¼" cuvette, showed: yellow 3, red 0.5.

EXAMPLE 2a 1,000 gm of the mixed fatty acid (64% linoleic acid) together with 17 gm of sodium sulfite were heated to 225° C. for 4 hours in an autoclave. The water content of the reaction mixture was about 0.3%. After the addition of 150 ml of 10% sulfuric acid, the product was washed about neutral with water and distilled. 83% distillate and 17% residue were obtained.

Analysis of the distillate:
- 53% conjuene fatty acid, of this:
  - 18% cis-trans
  - 31% trans-trans
  - 4% cis-cis
- 1.6% linoleic acid.

Analysis of the residue: Acid No. 182
- Saponification No. 200
- Iodine No. 99 (by Kaufmann)
- molecular weight 580 (osmometrically in acetone)
- color: Gardner (10 mm) 14–15

EXAMPLE 2b

Example 2a was repeated, but instead of $Na_2SO_3$, 0.5% $SO_2$ and 0.6% NaOH were used and the temperature was 200° C. instead of 225° C. Now, 91.6% distillate, 41.5% conjuene fatty acid and 8.4% residue were obtained.

EXAMPLE 3

Respective experiments with various catalysts were performed according to the process of Example 2a. The work was carried out with 100 gm batches and without pressure. The reaction mixture was heated at 225° C. for 4 hours with the possibility of refluxing (reflux condensor without cooling liquid; reflux water dripped back into the reaction vessel during the entire heating period). The distillation of the reaction product was carried out without preceding washing. The yields of conjuene fatty acids and residue obtained by this are compiled in the Table below. As in the preceding examples, the percentages given are % by weight.

TABLE

| Experiment | Catalyst | % | % Conjuene fatty acid in the distillate | % Residue |
|---|---|---|---|---|
| 1 | $Na_2SO_3$ | 1.5 | 43.6 | 21.7 |
| 2 | $Na_2SO_3$ | 2.0 | 48.3 | 20.2 |
| 3 | $Na_2S_2O_5$ | 1.5 | 42.3 | 18.9 |
| 4 | $Na_2S_2O_5$ | 2.0 | 46.6 | 17.9 |
| 5 | $Na_2S_2O_4$ | 1.5 | 32.8 | 17.1 |
| 6 | $Na_2S_2O_4$ | 2.5 | 43.0 | 33.0 |

In a parallel experiment, the work was performed with 1.0% by weight of NaOH as catalyst and with gaseous $SO_2$ (about 10 L/hr). 47.9% of conjuene fatty acid and 26.7% of residue are obtained. When the same experiment was repeated, but without the addition of NaOH, only 10.5% conjuene fatty acid and 11.8% residue are obtained.

In another parallel experiment, the work was performed with 0.2% instead of 1.0% NaOH as catalyst. 42.5% of conjuene fatty acids and 16.7% of residue are obtained. When the same experiment was repeated, but in an open flask without the possibility of condensation for the released water, only 6.1% of conjuene fatty acids and 12.7% of residue are obtained.

COMPARISON EXAMPLE

Gaseous $SO_2$ was passed through the fatty acid mixture in which 1.0% by weight of NaOH had been dissolved, in an amount of 0.7%/hour for 2 hours at 265° C., according to Example 1. The work was performed without reflux cooling and recycling of the water (reflux condenser without cooling liquid; practically all the water was removed with the $SO_2$ at 265° C.). The product of the process was washed with dilute sulfuric acid and with water and then distilled. A distillate was obtained with only 6.7% by weight of conjuene fatty acid. The distillation residue amounts to 10.5%.

When the sulfur dioxide was passed through the fatty acid mixture (with a content of 1.0% by weight of NaOH) in an amount of 0.63% by weight/hour for 4 hours at 225° C. under otherwise identical conditions, then the distillate contains only 18.3% by weight of conjuene fatty acids and a distillation residue of 8.5% by weight was obtained.

The preceding specific embodiments are illustrative of the practice of the invention. It is to be understood however, that other expedients known to those skilled in the art or disclosed herein may be employed without departing from the spirit of the invention or the scope of the appended claims.

We claim:

1. A process for the conjugation of the double bonds of polyunsaturated fatty acids consisting essentially of treating an acidic material consisting essentially of polyunsaturated fatty acids or mixtures of fatty acids containing polyunsaturated fatty acids with $SO_2$ in the presence of a substoichiometric amount of at least one soap-forming base at a temperature range of from 170° C. to 260° C., and recovering conjugated double bond polyunsaturated fatty acids, wherein said treating step is performed in the presence of from 0.5 to 25 mol %, based on said acidic material of $SO_2$; from 0.5 to 25 mol %, based on said acidic material of at least one soap-forming base selected from the group consisting of alkali metal compounds and alkaline earth metal compounds; and from 0.05 to 2% by weight, based on said acidic material, of water.

2. The process of claim 1 wherein said treating step is performed in the presence of from 1 to 1.25 mol %, based on said acidic material of $SO_2$; from 1 to 12.5 mol %, based on said acidic material, of at least one soap-forming base selected from the group consisting of alkali metal compounds and alkaline earth metal compounds; and from 0.1 to 1.5% by weight, based on said acidic material, of water.

3. The process of claim 2 wherein said water is present in an amount of from 0.2 to 1% by weight.

4. The process of claim 1 or 2 or 3 wherein said treating step is performed in the presence of from 1.5 to 8 mol % of $SO_2$, from 1.5 to 10 mol % of a soap-forming alkali metal compound, and from 0.2 to 1% by weight of water, all based on said acidic material, at temperatures of from 180° C. to 240° C. for from 1 to 6 hours.

5. The process of claim 1 or 2 or 3 wherein said $SO_2$ is at least partially derived from salts releasing $SO_2$ at the reaction temperature.

6. The process of claim 5 wherein said salts releasing $SO_2$ are alkali metal salts selected from the group consisting of alkali metal sulfites, alkali metal metasulfites and alkali metal dithionites.

7. The process of claim 1 or 2 or 3 wherein said $SO_2$ is at least partially derived from the introduction of gaseous $SO_2$.

8. The process of claim 1 or 2 or 3 wherein said acidic material is a mixture of fatty acids containing at least 30% by weight of polyunsaturated fatty acids.

9. The process of claim 8 wherein said mixture of fatty acids contains at least 40% by weight of polyunsaturated fatty acids.

10. The process of claim 1 or 2 or 3 wherein said treating step is performed in a closed pressure reaction zone.

11. The process of claim 1 or 2 or 3 wherein said treating step is performed in a reaction zone equipped to condense and return evaporated water, the water content in said reaction zone being maintained at least at 0.5% by weight, based on said acidic material.

* * * * *